(12) United States Patent
Lin (10) Patent No.: US 8,843,681 B2
(45) Date of Patent: Sep. 23, 2014

(54) TECHNIQUES FOR ACCESSING MEMORY, SYSTEM AND BUS ARBITRATION

(75) Inventor: Chuan Lin, Beijing (CN)

(73) Assignee: Wuxi Vimicro Corporation, Jiangsu (CN)

( * ) Notice: Subject to any disclaimer, the term of this patent is extended or adjusted under 35 U.S.C. 154(b) by 0 days.

(21) Appl. No.: 13/230,793

(22) Filed: Sep. 12, 2011

(65) Prior Publication Data

US 2012/0159027 A1    Jun. 21, 2012

Related U.S. Application Data

(63) Continuation of application No. PCT/CN2010/073880, filed on Jun. 12, 2010.

(51) Int. Cl.
*G06F 13/362* (2006.01)
*G06F 13/18* (2006.01)
*G06F 13/16* (2006.01)

(52) U.S. Cl.
CPC ............... *G06F 13/16* (2013.01); *G06F 13/18* (2013.01)
USPC ........................... 710/113; 710/114; 710/309

(58) Field of Classification Search
USPC ........................................ 710/113–114, 309
See application file for complete search history.

(56) References Cited

U.S. PATENT DOCUMENTS

| | | | | |
|---|---|---|---|---|
| 5,862,353 A | * | 1/1999 | Revilla et al. ................. | 710/107 |
| 5,983,301 A | * | 11/1999 | Baker et al. ................... | 710/113 |
| 2003/0115393 A1 | * | 6/2003 | Kim .............................. | 710/240 |
| 2005/0060450 A1 | * | 3/2005 | Tsai .............................. | 710/100 |

* cited by examiner

*Primary Examiner* — Nimesh G Patel
(74) *Attorney, Agent, or Firm* — Wuxi Sino IPs Ltd.; Joe Zheng (57) ABSTRACT

Method, system, bus arbitration device for accessing a memory are described. According to one embodiment, priorities of N function modules accessing the memory are compared to obtain location information of a function module with the highest priority. A bus of the function modules accessing the memory is switched to the function module with the highest priority by performing logic operation on the location information and bus information of each function module. Further, a bus arbitration device including a priority arbitration unit and a bus switching unit is described.

10 Claims, 3 Drawing Sheets

FIG. 1

(Prior Art)

TECHNIQUES FOR ACCESSING MEMORY, SYSTEM AND BUS ARBITRATION

CROSS-REFERENCE TO RELATED APPLICATION

This application is a continuation application of International Application No. PCT/CN2010/073880, filed Jun. 12, 2010.

BACKGROUND OF THE INVENTION

1. Field of the Invention

The invention relates to the area of data communication, and particularly, to techniques and an arbitration device for accessing a memory device.

2. Description of Related Art

A typical system-on-chip (SoC) has various function modules, such as processors and hardware accelerators, which may be required to access a memory. The memory includes an external memory, for example, an SDRAM (Synchronous Dynamic Random Access Memory), a DDR memory, and an NOR memory, and may also include a shared memory on chip such as ROM, SRAM (Static Random Access Memory) for facilitating communication among the function modules.

A processor and other function modules work independently and access the memory respectively based on their own demands. Thus, each memory may be accessed by several function modules. However, a typical high-capacity memory can be accessed by only one of the function modules at a time. The access to the memory should be carried out by a bus arbitration device that dictates which one of the function modules can access the memory according to a set of certain criteria and in the meantime temporarily suspends access requests by other function modules until the access of the present function module is completed.

Figure 1:
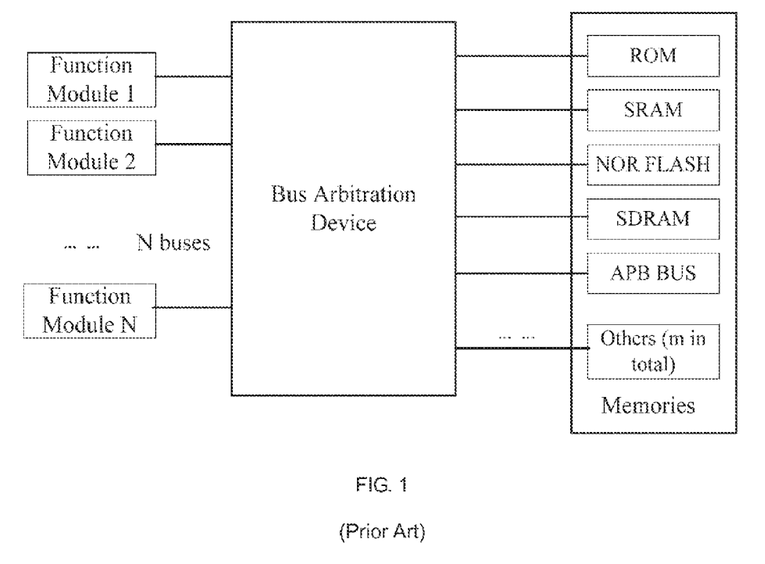
FIG. 1 shows a system accessing a memory in prior arts.

A conventional system for accessing the memory shown in FIG. 1 includes N function modules, a bus arbitration device, a plurality of types of memories, and N buses connecting the bus arbitration device to the N function modules. All function modules rely on an independent bus arbitration device to be granted the access permission at a certain time. Each of the function modules is given a predetermined priority. The bus arbitration device chooses to grant a function module with the highest priority the access permission according to the predetermined priority of each of the function modules, and then switches a bus of the memory to the bus corresponding to the function module obtaining the access permission.

The bus arbitration device in a conventional design compares the priorities of these function modules through a tree comparator, outputs a serial number of the function module having the highest priority, and then drives a multi-selector to select one of buses to a memory according to the serial number of the function module so as to switch the bus of the memory to the bus of the function module that has the highest priority.

A principle of the operation of the tree comparator can be understood in following description. The priorities of every two neighboring function modules in a first stage are compared with each other, by which N/2 comparing results can be obtained. The function modules with higher priority corresponding to the N/2 results are classified to a second stage. The priorities of every two neighboring function modules in the second stage are compared with each other, by which N/4 results can be obtained. The function modules corresponding to the N/4 results are classified to a third stage. The rest function module can be compared in the same manner until only one result is obtained, i.e., the serial number of the function module with the highest priority is obtained. Thus, log 2N may be the stage number of the tree comparator. At least one exclusive-OR gate is necessary at each stage of the tree comparator. Thus, signals may undergo delays at least log 2N exclusive-OR gates. The function module with the highest priority functions as a selecting end of the multi-selector while the buses corresponding to the function modules function as inputs of the multi-selector. The bus of the memory functions as an output of the multi-selector. The multi-selector switches the bus of the memory to that of the function module with the highest priority, according to the serial number of the function module selected by the multi-selector.

In a complicated SoC, there could be many of the function modules that need to perform parallel operations. With the frequency of a system becoming increasingly high, the requirements on an arbitration switching circuit become higher with so many function modules. For example, the delay of the arbitration switching circuit should be limited within 8 ns when the frequency of the clock of the bus is higher than 125 MHz. The number N in the prior arts is typically larger than 16. However, when the stage number of the tree comparator is greater than 5, it is difficult to limit the delay of the arbitration switching circuit within 8 ns. Thus, improvement of the speed of the arbitration switching circuit is highly desired although the difficulty in design is known in a system with many function modules running at high speeds.

In brief, one problem needed to be solved is to minimize the delay of the arbitration switching circuit and increase the operation speed of the arbitration switching circuit so as to enable the arbitration switching circuit to be widely applied to various SoC chips and satisfy requirements under various conditions.

SUMMARY OF THE INVENTION

One of the technical problems to be solved in the present invention is to provide a method, a system, and a bus arbitration device for accessing a memory to improve speed of a bus switching circuit and solve problems on compatibility between speed of the bus switching circuit and system frequency.

To solve the above technical problem, the present invention provides a method for accessing a memory comprising comparing priorities of N function modules accessing the memory to obtain location information of the function module with the highest priority, and switching a bus of the function modules accessing the memory to the function module with the highest priority by performing logic operation on the location information and bus information of each function module, where N is a natural number larger than one.

The location information is a binary code with N digits. If one digit of the location information is "1", the function module that the digit corresponds to has the highest priority.

Further, the step of comparing priorities of N function modules accessing the memory comprises comparing the priority of each function module with the priorities of the other function modules according to a comparing strategy, respectively generating an intermediate comparing result presented by a binary code with N−1 digits corresponding to each function module, each digit of the intermediate comparing result indicates a comparison result of the priorities between the function module and the other function modules and performing an AND-operation on all digits of the intermediate comparison result of each function module to obtains an operation result represented by a single binary code, the N function modules' operation results arranged in order of serial numbers corresponding to the function modules composing the location information of the function module with the highest priority.

In one embodiment, the comparing strategy is that: if a serial number of a function module is larger than that of another function module being compared with, then to determine whether a value of the priority of the function module is larger than or equal to that of the other function module being compared, else to determine whether the value of the priority of the function module is larger than that of the other function module being compared, where the value of the priority of the function module is larger, the priority of the function module is higher.

In one embodiment, the comparing strategy is that: if a serial number of a function module is smaller than that of another function module being compared, then determine whether the value of the priority of the function module is smaller than or equal to those of all the other function module being compared, else determine whether a value of the priority of the function module is smaller than that of the other function module being compared, wherein the value of the priority of the function module is smaller, the priority of the function module is higher.

In one embodiment, when all function modules have the same priority, the function module with the largest serial number is awarded the highest priority.

In one embodiment, when all function modules have the same priority, the function module with the smallest serial number is awarded the highest priority.

In one embodiment, the step of performing logic operation on the location information and bus information of each function module comprises: the bus information of each function module being a binary code with T digits, performing an AND-operation onto a same digit of the bus information of all function modules respectively with the digits of the location information corresponding to all function modules, obtaining N AND-operation results of the bus information of the function module at the same digit, wherein T is a bit width of the bus of the function module; and then performing an OR-operation onto the N AND-operation results, obtaining an OR-operation result of the bus information of the function modules at the same digit; T OR-operation results of the bus information of the function modules obtained at all digits of the bus information composing the bus information of the function module with the highest priority.

The invention also provides a system for accessing memory comprising N function modules, a bus arbitration device, and at least one memory. The N function modules is respectively connected to the bus arbitration and configured for accessing the at least one memory via the bus arbitration device. N is a natural number larger than one. The bus arbitration device comprises a priority arbitration unit configured for comparing priorities of the N function modules accessing the memory and obtaining location information of the function module with the highest priority and a bus switch unit configured for switching a bus of the function module accessing the memory to the function module with the highest priority by logically operating the location information and bus information of each function module. The at least one memory receives the bus information of the function module with the highest priority selected by the bus arbitration device.

The invention also provides a bus arbitration device. The bus arbitration device comprises a priority arbitration unit configured for comparing priorities of N function modules accessing a memory and obtaining location information of the function module with the highest priority and a bus switch unit configured for switching a bus of the function module accessing the memory to the function module with the highest priority by logically operating the location information and bus information of each function module.

In one embodiment, the location information obtained by the priority arbitration unit is a binary code with N digits, if one digit of the location information is "1", the function module corresponding to the digit has the highest priority.

In one embodiment, the priority arbitration unit comprises a comparator configured for comparing the priority of each function module with the priorities of the other function modules and then respectively generating an intermediate comparing result represented by a binary code with N−1 digits corresponding to each function module and a first AND-operation unit configured for performing an AND-operation onto all digits of the intermediate comparing result, corresponding to each function module, and thereby obtaining an operation result represented by a binary code with a single digit; the operation results of the N function modules arranged in an order of the N function modules' corresponding serial numbers composing the location information of the function module with the highest priority. Each digit of the intermediate result indicates the result of the comparison between the function module and the other function modules.

In one embodiment, the comparing strategy is that: if a serial number of a function module is larger than that of another function module being compared, with, then to determine whether the value of the priority of the function module is larger than or equal to that of the other function module being compared, else to determine whether the value of the priority of the function module is larger than that of the other function module being compared. The value of the priority of the function module is larger, the priority of the function module is higher.

In one embodiment, the comparing strategy is that: if a serial number of a function module is smaller than that of another function module being compared, then determine whether the value of the priority of the function module is smaller than or equal to those of all the other function module being compared, else determine whether a value of the priority of the function module is smaller than that of the other function module being compared. The value of the priority of the function module is smaller; the priority of the function module is higher.

In one embodiment, the bus switch unit comprises a second AND-operation unit and an OR-operation unit. The second AND-operation unit is configured for performing an AND-operation onto a same digit of bus information represented by a binary with T digits of all function modules respectively with the digits of the location information corresponding to all function modules and thereby obtaining N AND-operation results of the bus information of the function module at the same digit. The OR-operation unit is configured for performing an OR-operation onto the N AND-operation results, obtaining an OR-operation result of the bus information of the function modules at the same digit. T OR-operation results of the bus information of the function modules obtained at all digits of the bus information compose the bus information of the function module with the highest priority.

The comparison of the priorities of the N function modules to obtain location information of the function module with the highest priority needs a comparator delay of the first degree and an and-gate of the N−1th degree. The logical operation on the location information and the bus information of each function module for switching the bus of the function module accessing the memory to the function module with the highest priority needs an and-gate of the first degree and an or-gate delay of the Nth degree. Thus, the entire method for accessing a memory needs a comparator delay of the first degree, an and-gate of the Nth degree, and an or-gate of the Nth degree. A logic depth of a tree-formed comparator is an exclusive-OR gate delay of the log 2Nth degree in prior arts. The delay of a multi-digit comparator and the exclusive-OR gate is far more than that of the and-gate and the or-gate in a circuit. Due to that the present invention does not refer to the multi-digit comparator and the exclusive-OR gate but only refers to a comparator delay of the first degree, an and-gate of the Nth degree, and an or-gate of the Nth degree, the present invention shortens the delay of the bus arbitration switching circuit and increases the speed of the bus arbitration switching circuit, which enables the bus arbitration switching circuit to be widely employed in various SoC chips and meet various requirements.

DETAILED EMBODIMENTS

The detailed description of the present invention is presented largely according to drawings and various embodiments to explain objections, features, and advantages of the present invention.

Referring to FIG. 1, it is a bus arbitration switching circuit including a plurality of function modules, a bus arbitration device, and a plurality of memories. The function modules accesses the memories as desired through the bus arbitration device. The independent bus arbitration device determines which one function module should be allowed to access one of the memories at a certain time according to priorities of the function modules going to access one of the memories. The bus arbitration device switches the bus of the memory to the bus of the function module with the highest priority. Depending on application, the function modules may access a plurality of memories if needed. A method for accessing a memory is presented by an example, in which N function modules access a certain memory. N is an integer number greater than one. Given the description herein, the process of one or more of the function modules accessing other memories is shall be evident to those skilled in the art.

The N buses of the N function modules are used as inputs of the bus arbitration device. The bus arbitration device arbitrates in the priorities among the N function modules, selects a function module with the highest priority from those function modules requesting an access request, grants the function module with the highest priority an access permission, and switches the bus for accessing a certain memory to the function module with the highest priority by bus switching. Thus, the bus of the function module with the highest priority is used as an output of the bus arbitration device and connected to the memory for accessing. The priorities of the N function modules going to access the memory are firstly compared to identify the function module with the highest priority. The bus of the memory is then switched to the bus of the function module with the highest priority.

Figure 2:
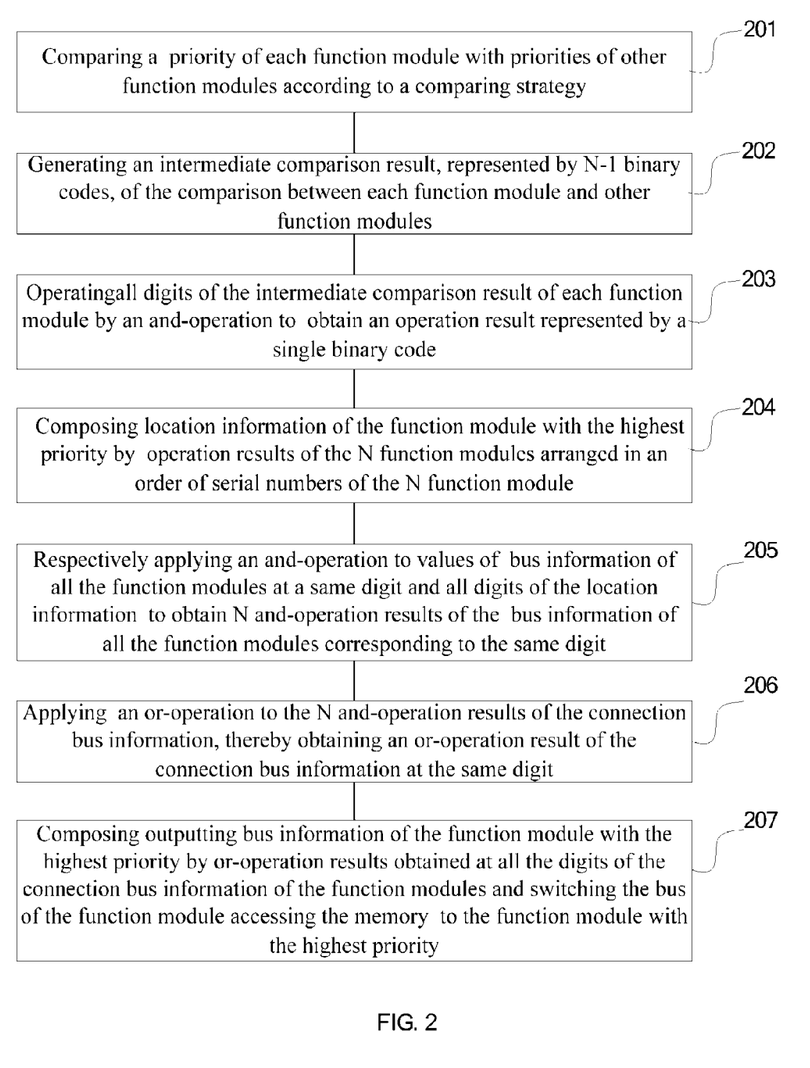
FIG. 2 is a flow chart of a method to access a memory in a preferred embodiment of the present invention.

Referring now to FIG. 2, it shows a flowchart or process 200 for accessing a memory according to one embodiment of the invention. At 201, the priority of each function module is compared with the priorities of other function modules according to a set of comparing criteria. Each function module has a predetermined priority in a system. The comparisons among the function modules requesting an access request and the other function modules are carried out concurrently. A value of the priority of each function module is denoted by a binary code as PRI. Correspondingly, a value of the priority of a function module i is symbolized by PRIi. A value of the priority of another function module j is symbolized by PRIj, where j≠i. The comparison between the priorities of the function module i and the function module j may be carried out according to a predetermined strategy. The function module has the highest priority can be determined according to a comparison result of the priorities of the function modules, i.e., a comparison result between PRIi and PRIj. One way to determine which one of the function modules has the highest priority can be carried out in the following operations:

the priority of the function module is higher if the value of the priority of the function module is greater;

or the priority of the function module is higher if the value of the priority of the function module is smaller; and when all function modules have the same priority, the function module with the largest serial number is awarded the highest priority; or, when all function modules have the same priority, the function module with the smallest serial number is awarded the highest priority.

At 202, an intermediate comparison result, represented in N−1 binary codes, of the comparison between each function module and the other function modules is generated. The intermediate comparison result of the comparison between each function module and the other function modules is recorded as CMP[N−2:0]. For example, the intermediate comparison result of the comparison between a function module i and the other function modules is written as CMPi[N−2:0], which denotes a set of comparisons of the function module i with the other N−1 function modules. A priority comparison result between the function module i and the function module j is written as CMPi[t] (t=0, 1, ... N−2). The priority comparison result corresponds to a digit t of CMPi[N−2:0]. The comparison result of the function module i with the function module j may include following examples:

CMPi[t]=PRIi≥PRIj;
CMPi[t]=PRIi>PRIj;
CMPi[t]=PRIi≤PRIj; and
CMPi[t]=PRIi<PRIj.

At 203, all digits of the intermediate comparison result of each function module are operated by an AND-operation, which obtains an operation result represented by a single binary code. For example, corresponding to the function module i, an operation result represented by a single binary code ARB[i] may be obtained. ARB[i] is obtained by and-operating N−1 digits of the intermediate comparison result CMPi[N−2:0] of the function module i, i.e., ARB[i]=CMPi[0] & CMPi[1] & ... & CMPi[N−2].

Each digit of the intermediate comparison result of the function module with the highest priority is "1" because of that the priority of the function module with the highest priority is higher than that of the other function modules. Thus, the operation result of the digits of the intermediate comparison result of the function module with the highest priority under the AND-operation is the single binary code "1". A digit of the intermediate comparison result of any other function module, corresponding to the function module with the highest priority, is "0". Thus, the operation result of the digits of the intermediate comparison result of any other function module under the AND-operation is the single binary code "0".

At 204, the operation results of the N function modules arranged in an order of serial numbers of the N function modules compose location information of the function module with the highest priority.

The operation results of the N function modules arranged in order according to the serial numbers of the corresponding function modules compose the location information ARB[N−1: 0] of the function module with the highest priority. Each digit of the location information ARB[N−1: 0] is an operation result at step 203. The comparisons among the N function modules in the present embodiment is not to obtain the serial number of the function module with the highest priority, but in order to obtain the location information ARB[N−1: 0] of the function module with the highest priority. The location information ARB[N−1: 0] is a binary code with N digits. If the digit (K is a natural number) of the location information ARB[N−1: 0] is "1", the function module K corresponding to the $K^{th}$ digit has the highest priority.

At 205, the values of the bus information of all function modules at a same digit and all digits of the location information are respectively operated by an AND-operation, so as to obtain N AND-operation results of the bus information of all function modules corresponding to the same digit, where connection bus information of each function module is a binary code with T digits, which is written as MBUSi[T−1:0] (i=0 . . . N−1). T is a bit width of the connection bus of the function module. One digit of each connection bus information, e.g., the $m^{th}$ digit written as MBUS[m], together with each digit of the location information ARB[N−1: 0], are operated by an AND-operation to obtain N AND-operation results of the connection bus information corresponding to the digit m written as follows:

MBUS0[m] & ARB[0];
MBUS1[m] & ARB[1];
. . .
MBUSN−1[m] & ARB[N−1]

At 206, the N AND-operation results of the connection bus information are operated by an OR-operation, thereby obtaining an OR-operation result of the connection bus information at the same digit. The OR-operation result of the connection bus information at the same digit is obtained based on the N AND-operation results at the step 205. For example, the OR-operation result of the bus information of the function modules at the $m^{th}$ digit is written as SBUS[m].

Thus, $$SBUS[m] = \{MBUS0[m] \& ARB[0]\} | \\ \{MBUS1[m] \& ARB[1]\} | \\ \ldots \\ \{MBUSN\text{-}1[m] \& ARB[N\text{-}1]\}.$$

Only the digit corresponding to the function module with highest priority in the location information ARB[N−1: 0] is "1", and the digits corresponding to the other function modules are "0". Thus, SBUS[m] represents the $m^{th}$ digit of outputting bus information of the function module with the highest priority. T OR-operation results can be obtained by putting each digit of the connection bus information of the function modules into the OR-operation.

At 207, the T OR-operation results obtained at all digits of the connection bus information of the function modules compose outputting bus information of the function module with the highest priority. The bus of the function module accessing the memory is switched to the function module with the highest priority.

As ARB[N−1: 0] is a binary code, in which only the digit corresponding to the function module with highest priority is "1", and that SBUS[m] represents the digit m of the outputting bus information of the function module with highest priority, the T OR-operation results obtained respectively corresponding to all digits of the outputting bus information of the function modules compose the outputting bus information SBUS[T−1: 0] of the function module with the highest priority. Thus, only the outputting bus information of the function module with the highest priority is delivered, but the bus information of other function modules is masked. SBUS [T−1: 0] represents the outputting bus information of the function module with the highest priority. Thus, the bus of the function module accessing the memory is switched to the function module with the highest priority according to the final operation result, thereby finishing the access of the function module with the highest priority to the memory.

The comparing strategy described at 201 may have many forms. Depending on implementation, there are different comparing strategies. Some are explained below:

Comparing Strategy I:

In a first embodiment of the present invention, the priority of each function module is compared with the priorities of other function modules. The comparing strategy employed in the above comparison is that: if a serial number of a function module is larger than that of another function module being compared, then determine whether the value of the priority of the function module is larger than or equal to that of the other function module being compared, else determine whether the value of the priority of the function module is larger than that of the other function module being compared. Wherein, the value of the priority of the function module is larger, the priority of the function module is higher. The above described comparing strategy may be also presented as follows:

if i>j (i=0, 1, . . . N−1; j=0, 1, . . . N−1 且 j≠i)
CMPi[t]=PRIi≥PRIj
else
CMPi[t]=PRIi>PRIj In the present embodiment, four function modules such as a function module 0, a function module 1, a function module 2, and a function module 3, are assumed to access the memory, accordingly, t=0, 1, 2.

The intermediate comparison result of the function module 0 is written as CMP0[2: 0], wherein i=0, i is smaller than any available value of j, thereby:

CMP0 [0]=PRI0>PRI1;
CMP0 [1]=PRI0>PRI2;
CMP0 [2]=PRI0>PRI3.

The intermediate comparison result of the function module 1 is written as CMP1[2: 0], i=1, thereby:

CMP1[0]=PRI1≥PRI0;
CMP1[1]=PRI1>PRI2;
CMP1[2]=PRI1>PRI3.

The intermediate comparison result of the function module 2 is written as CMP2[2: 0], i=2, thereby:

CMP2 [0]=PRI2≥PRI0;
CMP2 [1]=PRI2≥PRI1;
CMP2 [2]=PRI2>PRI3.

The intermediate comparison result of the function module 3 is written as CMP3[2: 0], i=3, thereby:

CMP3 [0]=PRI3≥PRI0;
CMP3 [1]=PRI3≥PRI1;
CMP3 [2]=PRI3≥PRI2.

In the present embodiment, the relationship of the priorities of the function modules should be: the priority of the function module 0> the priority of the function module 1> the priority of the function module 2> the priority of the function module 3.

Therefore, the relationship of the values of the priorities of the function modules should be: PRI0>PRI1>PRI2>PRI3. The intermediate comparison results of all function modules are written as follows:
CMP0 [2: 0]=[1, 1, 1];
CMP1[2: 0]=[1, 1, 0];
CMP2 [2: 0]=[1, 0, 0];
CMP3 [2: 0]=[0, 0, 0].

All digits of the intermediate comparison result of each function module are operated by an AND-operation, which obtains an operation result represented by a binary code with a single digit. The location information ARB[3,0] of the function module with the highest priority formed by the operation results of the four function modules is a binary code with four digits. Each digit shows whether the function module i that the digit corresponds to has the highest priority.

All digits of the location information ARB[3,0] may be recorded as following equations:
ARB [0]=CMP0[0] & CMP0[1] & CMP0[2]=1;
ARB [1]=CMP1[0] & CMP1[1] & CMP1[2]=0;
ARB [2]=CMP2[0] & CMP2[1] & CMP2[2]=0;
ARB [3]=CMP3[0] & CMP3[1] & CMP3[2]=0.

Because of that the priority of the function module 0 is higher than that of any other function module, each digit of the intermediate comparison result of the function module 0 is "1" and the result of the AND-operation on all digits is also "1". Referring to the other function modules, there is a digit corresponding to the function module 0, which should be "0", thereby the result of the AND-operation on all digits is also "0". The location information ARB[3,0] is equal to [0,0,0,1], its digit 0 is "1", which signifies that the function module 0 has the highest priority, and the other digits is zero.

And then, the location information and the bus information of each function module are operated by an AND-operation. Regarding to those four function modules accessing the memory, the connection bus information of each function module is a binary code with three digits written as MBUSi[2: 0] (i=0 . . . 3). The digit m of the connection bus information of each function module and all digits of the location information are respectively operated by the AND-operation thereby obtaining four AND-operation results: MBUS0[m] & ARB[0]; MBUS1[m] & ARB[1]; MBUS2[m] & ARB[2]; and MBUS3[m] & ARB[3].

The four AND-operation results are operated by the OR-operation so as obtain an OR-operation result: SBUS[m]= {MBUS0[m] & ARB[0]}|{MBUS1[m] & ARB[1]}| {MBUS2[m] & ARB[2]}|{MBUS3[m] & ARB[3]}.

Therefore, SBUS[0]=MBUS0[0]; SBUS[0]=MBUS0[1]; SBUS[0]=MBUS0[2].

Three OR-operation results can be obtained by the logic operations of all digits of the connection information of the function modules and the location information. These OR-operation results compose an outputting bus information SBUS[2: 0] of the function module with the highest priority. Because ARB[2: 0] is a code, in which only ARB[0] with the highest priority is "1", except that the bus information of the function with the highest priority is released, the bus information of the other function modules is masked. Thus, SBUS [2: 0] represents the outputting bus information of the function module 0 with the highest priority. The bus of the function module accessing the memory is switched to the bus of the function module with the highest priority so as to finish the access of the function module to the memory.

Furthermore, in case all function modules have the same priority, the relation of the values of the priority of the function should be recorded as: PRI0=PRI1=PRI2=PRI3. Therefore,
CMP0 [2: 0]=[0, 0, 0];
CMP1[2: 0]=[0, 0, 1];
CMP2 [2: 0]=[0, 1, 1];
CMP3 [2: 0]=[1, 1, 1]; and
ARB [0]=CMP0[0] & CMP0[1] & CMP0[2]=0;
ARB [1]=CMP1[0] & CMP1[1] & CMP1[2]=0;
ARB [2]=CMP2[0] & CMP2[1] & CMP2[2]=0;
ARB [3]=CMP3[0] & CMP3[1] & CMP3[2]=1.

When all function modules have the same priority, the priority of the function module (the serial number of which is 3, in the present embodiment) with the largest serial number is equal to those of the other function modules. Thus, all digits of its intermediate comparison result should be "1", and the result of the AND-operation of all digits is also "1". The digit of the other function modules corresponding to it is "0", and the results of the AND-operation of the digits of the other function modules are also "0". Thus, the location information ARB[3, 0]=[1, 0, 0, 0].

Therefore, the location information and the bus information of all function modules are logically operated to generate a switching bus information SBUS[2: 0] that represents the bus information of the function module 3. That is, the bus is switched to the function module 3 with the largest serial number.

Comparing Strategy II:

In a second embodiment of the present invention, compared to the first embodiment, in case the comparing strategy is configured as follows:
if i>j (i=0, 1, . . . N−1; j=0, 1, . . . N−1 ⊥⊥ j≠i)
CMPi[t]=PRIi>PRIj
else
CMPi [t]=PRIi≥PRIj;

when the priorities of the function modules are different, the intermediate comparing result and the location information of the function module with the highest priority are the same to those in the first embodiment.

Furthermore, in case all function modules have the same priority, the priority of the function module (the serial number of which is 0, in the present embodiment) with the smallest serial number is equal to those of the other function modules. Thus, all digits of its intermediate comparison result should be "1", and the result of the AND-operation of all digits is also "1". The digit of the other function modules corresponding to it is "0", and the results of the AND-operation of the digits of the other function modules are also "0". Thus, the location information ARB[3, 0]=[0, 0, 0, 1].

Therefore, the location information and the bus information of all function modules are logically operated to generate a switching bus information SBUS[2: 0] that represents the bus information of the function module 0. That is, the bus is switched to the function module 0 with the smallest serial number.

Comparing Strategy III:

In a third embodiment of the present invention, comparing the priorities of the N function modules accessing the memory, a comparing strategy employed is that: if a serial number of a function module is smaller than that of another function module being compared, then determine whether the value of the priority of the function module is smaller than or equal to those of the other function module being compared, else determine whether the value of the priority of the function module is smaller than that of the other function module being compared. Wherein, the value of the priority of the function module is larger, the priority of the function module is higher. The above described comparing strategy may be also presented as follows:

if i<j (i=0, 1, . . . N−1; j=0, 1, . . . N−1 且 j≠i)
CMPi[t]=PRIi≤PRIj
else
CMPi [t]=PRIi<PRIj.

In the present embodiment, the four function modules such as a function module 0, a function module 1, a function module 2, and a function module 3, are going to access the memory. As to the intermediate comparing result CMP0[2: 0] of the function module 0, i=0, i is smaller than j, so:

CMP0 [0]=PRI0≤PRI1;
CMP0 [1]=PRI0≤PRI2;
CMP0 [2]=PRI0≤PRI3.

As to the intermediate comparing result CMP1[2: 0] of the function module 1, i=1, so:

CMP1[0]=PRI1<PRI0;
CMP1[1]=PRI1≤PRI2;
CMP1[2]=PRI1≤PRI3.

As to the intermediate comparing result CMP2[2: 0] of the function module 2, i=2, so:

CMP2 [0]=PRI2<PRI0;
CMP2 [1]=PRI2<PRI1;
CMP2 [2]=PRI2≤PRI3.

As to the intermediate comparing result CMP3[2: 0] of the function module 3, i=2, so:

CMP3 [0]=PRI3<PRI0;
CMP3 [1]=PRI3<PRI1;
CMP3 [2]=PRI3<PRI2.

In the present embodiment, the relation of the priority of the function modules may be presented as: the priority of the function module 2> the priority of the function module 0> the priority of the function module 1> the priority of the function module 3. Accordingly, the relation of the values of the priorities of the function modules should be: PRI2>PRI0>PRI1>PRI3. The intermediate comparison results corresponding to all function modules are written as follows:

CMP0 [2: 0]=[1, 1, 1];
CMP1 [2: 0]=[1, 1, 0];
CMP2 [2: 0]=[1, 0, 0];
CMP3 [2: 0]=[0, 0, 0].

All digits of the intermediate comparison result of each function module are operated by an AND-operation, which obtains an operation result represented by a binary code with a single digit. The AND-operation results of all digits of the intermediate comparing results of the four function modules form the location information ARB[3,0] of the function module with the highest priority. The location information ARB [3,0] is a binary code with four digits. Each digit indicates whether the function module it corresponds to has the highest priority.

The digits of the location information ARB[3,0] may be recorded as following equations:

ARB [0]=CMP0[0] & CMP0[1] & CMP0[2]=0;
ARB [1]=CMP1[0] & CMP1[1] & CMP1[2]=0;
ARB [2]=CMP2[0] & CMP2[1] & CMP2[2]=1;
ARB [3]=CMP3[0] & CMP3[1] & CMP3[2]=0.

Because of that the priority of the function module 2 is higher than that of any other function module, each digit of the intermediate comparison result of the function module 2 is "1" and the result of the AND-operation on all digits thereof is also "1". As to the other function modules, the digit of the intermediate comparison result corresponding to the function module 2 should be "0", thereby the result of the AND-operation on all digits is also "0". The location information is written as ARB[3,0]=[0, 1, 0, 0], and the second digit thereof is "1", which signifies that the function module 2 has the highest priority, and the other digits thereof is zero.

The location information and the bus information of each function module are operated by an AND-operation. The bus information of each function module is a binary code with three digits written as MBUSi[2: 0] (i=0, 1, 2, 3). The digit m of the bus information of all function modules and all digits of the location information are respectively operated by the AND-operation thereby obtaining four AND-operation results: MBUS0[m] & ARB[0]; MBUS1[m] & ARB[1]; MBUS2[m] & ARB[2]; and MBUS3[m] & ARB[3].

The four AND-operation results are operated by the OR-operation so as obtain an OR-operation result: SBUS[m]= {MBUS0[m] & ARB[0]}|{MBUS1[m] & ARB[1]}| {MBUS2[m] & ARB[2]}|{MBUS3[m] & ARB[3]}.

Therefore, SBUS[0]=MBUS2[0]; SBUS[1]=MBUS2[1]; SBUS[2]=MBUS2[2].

Three OR-operation results can be obtained by the logic operations of all digits of the connection information of the function modules and the location information. These OR-operation results compose an outputting bus information SBUS[2: 0] of the function module with the highest priority. Because ARB[2: 0] is a code, in which only ARB[2] with the highest priority is "1", except that the bus information of the function with the highest priority is released, the bus information of the other function modules is masked. Thus, SBUS [2: 0] represents the outputting bus information of the function module 2 with the highest priority. The bus of the function module accessing the memory is switched to the bus of the function module with the highest priority so as to finish the access of the function module 2 to the memory.

Furthermore, in case all function modules have the same priority, the relation of the values of the priority of the function should be recorded as: PRI0=PRI1=PRI2=PRI3. Therefore, CMP0 [2: 0]=[1, 1, 1];
CMP1 [2: 0]=[1, 1, 0];
CMP2 [2: 0]=[1, 0, 0];
CMP3 [2: 0]=[0, 0, 0]; and
ARB [0]=CMP0[0] & CMP0[1] & CMP0[2]=1;
ARB [1]=CMP1[0] & CMP1[1] & CMP1[2]=0;
ARB [2]=CMP2[0] & CMP2[1] & CMP2[2]=0;
ARB [3]=CMP3[0] & CMP3[1] & CMP3[2]=0.

When all function modules have the same priority, the priority of the function module with the smallest serial number (the serial number is 0) is equal to those of all the other function modules. Thus, all digits of its intermediate comparison result should be "1", and the result of the AND-operation of all digits is also "1". The digit of the other function modules corresponding to it is "0", and the results of the AND-operation of the digits of the other function modules are also "0". Thus, the location information ARB[3, 0]=[0, 0, 0, 1].

Therefore, the location information and the bus information of all function modules are logically operated to generate a switching bus information SBUS[2: 0] that represents the bus information of the function module 0. That is, the bus is switched to the function module 0 with the smallest serial number.

Comparing Strategy IV:

In a fourth embodiment of the present invention, referring to the third embodiment, if the comparing strategy is configured as:

if i<j (i=0, 1, . . . N−1; j=0, 1, . . . N−1 且 j≠i)
CMPi[t]=PRIi<PRIj
else
CMPi [t]=PRIi≤PRIj;

when the priorities of the function modules are different, the intermediate comparing result and the location information of the function module with the highest priority obtained are as described in the third embodiment.

Furthermore, in case all function modules have the same priority, the priority of the function module (the serial number of which is 3, in the present embodiment) with the largest serial number is equal to those of all the other function modules. Thus, all digits of its intermediate comparison result should be "1", and the result of the AND-operation of all digits is also "1". The digit of the other function modules corresponding to it is "0", and the results of the AND-operation of the digits of the other function modules are also "0". Thus, the location information ARB[3, 0]=[1, 0, 0, 0].

Therefore, the location information and the bus information of all function modules are logically operated to generate a switching bus information SBUS[2: 0] that represents the bus information of the function module 3. That is, the bus is switched to the function module 3 with the largest serial number.

It is clear from the foregoing explanation that the logic depth of the arbitration on the priority is an addition of comparator delay of the first degree and and-gate of the N−1th degree and that the logic depth of the bus switching is an addition of and-gate of the first degree and or-gate of the Nth degree. Thus, the process to accessing the memory needs a comparator delay of the first degree, an and-gate of the Nth degree, and an or-gate of the Nth degree. The logic depth of a desired comparator in a tree form is an exclusive-OR gate delay of the log 2Nth degree. The delay of the multilevel comparator and the exclusive-OR gate is far more than that of the and-gate and the or-gate in a circuit. Therefore, the present process can reach a higher speed then the conventional processes.

Figure 3:
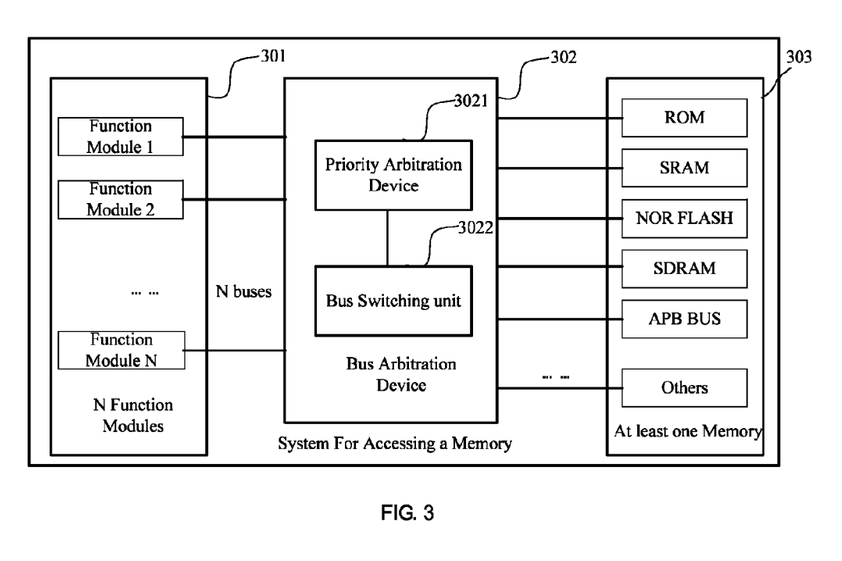
FIG. 3 is a structural diagram of a system accessing a memory in an embodiment of the present invention.

FIG. 3 shows a system for accessing a memory in an embodiment of the present invention. The system for accessing a memory includes N function modules 301, a bus arbitration device 302, and at least a memory 303. N is a nature number greater than one. Each of the function modules 301 operates independently and accesses to at least one memory as required. Thus, each memory may be simultaneously accessed by a plurality of function modules. However, a high capacity memory can permit only one function module to access for reading and writing at the same time according to physical characteristics of the memory. Thus, the access to the memory relies on that the bus arbitration device grants an access permission of the memory to an access request of a certain one of the function modules according to a certain selection strategy and temporarily suspends access requests of the other function module until the current access request finishes.

The N function modules 301 are respectively connected to the bus arbitration device 302 and configured to access the memory 303 via the bus arbitration device 302.

The bus arbitration device 302 includes a priority arbitration unit 3021 configured for comparing priorities of the N function modules 301 going to access the memory 301 and obtaining location information of the function module with the highest priority, a bus switching unit 3022 configured for logically operating the location information obtained by the priority arbitration unit 3021 and the bus information of each function module and switching the bus of the function module accessing the memory to the function module with the highest priority, and at least one memory 303 configured for receiving bus information of the function module with the highest priority selected by the bus arbitration device.

Each memory needs an independent bus arbitration device to determine which one function module should be allowed to access the memories at the same time. Each function module has a preconfigured priority. The bus arbitration device selects a function module with the highest priority from the function modules sending out access requests according to a comparing strategy, and then switches the bus of the memory to the bus corresponding to the function module with the highest priority, thereby the function module accessing the memory.

Figure 4:
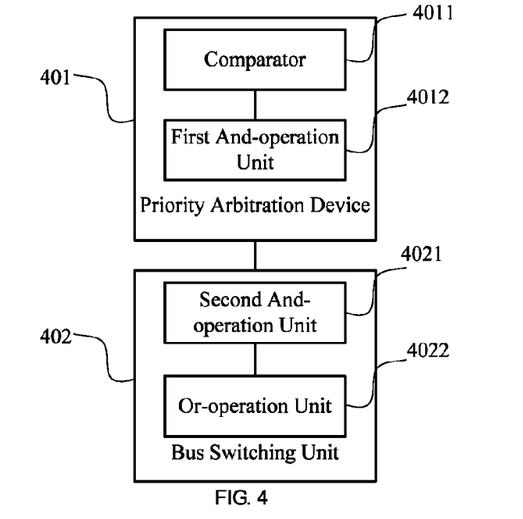
FIG. 4 is a structural diagram of a bus arbitration device in an embodiment of the present invention.

FIG. 4 shows a bus arbitration device in another embodiment of the present invention. The bus arbitration device is set in the system for accessing a memory. The bus arbitration device serves to compare priorities of the N function modules accessing the memory, select the function module with the highest priority, and switch the bus accessing the memory to the function module with the highest priority. The bus arbitration device includes a priority arbitration unit 401 and a bus switching unit 402.

The priority arbitration unit 401 is configured for comparing the priorities of the function modules accessing the memory and obtaining location information of the function module with the highest priority. The location information obtained by the priority arbitration unit 401 is a binary code with N digits. If the Kth digit is "1", it indicates that the function module K is of the highest priority.

The bus switching unit 402 is configured for switching an accessing bus of the memory to the function module with the highest priority by logically operating the location information and the bus information of each function module.

Furthermore, the priority arbitration unit 401 includes:

a comparator 4011, configured for comparing the priority of each function module with the priorities of the other function modules according to a comparing strategy and then respectively generating an intermediate comparing result represented by a binary code with N−1 digits corresponding to each function module, where each digit of the intermediate result indicates the result of the comparison between the function module and the other function modules; and a first AND-operation unit 4012 configured for performing an AND-operation onto all digits of the intermediate comparing result, corresponding to each function module, and thereby obtaining an operation result represented by a binary code with a single digit; the operation results of the N function modules arranged in an order of the N function modules' corresponding serial numbers composing the location information of the function module with the highest priority.

In a preferred embodiment of the present invention, a comparing strategy of the comparator 401 is described as follows:

if a serial number of a function module is larger than that of another function module being compared, then determine whether the value of the priority of the function module is larger than or equal to that of the other function module being compared, else determine whether the value of the priority of the function module is larger than that of the other function module being compared. Wherein, the value of the priority of the function module is larger, the priority of the function module is higher. When all function modules have the same priority, the function module with the largest serial number is awarded the highest priority.

In another preferred embodiment of the present invention, a comparing strategy of the comparator can be presented as follows:

if a serial number of a function module is smaller than that of another function module being compared, then determine whether the value of the priority of the function module is smaller than or equal to those of all the other function module being compared, else determine whether the value of the priority of the function module is smaller than that of the other function module being compared. Wherein, the value of the priority of the function module is smaller, the priority of the function module is higher. When all function modules have the same priority, the function module with the smallest serial number is awarded the highest priority.

The bus switching unit 402 further includes:

a second AND-operation unit 4021 configured for performing an AND-operation onto a same digit of bus information represented by a binary with T digits, of all function modules respectively with the digits of the location information corresponding to all function modules, and thereby obtaining N AND-operation results of the bus information of the function module at the same digit; and an OR-operation unit 4022 configured for performing an OR-operation onto the N AND-operation results, obtaining an OR-operation result of the bus information of the function modules at the same digit. T OR-operation results of the bus information of the function modules obtained at all digits of the bus information compose the bus information of the function module with the highest priority.

Therefore, to conclude, the embodiments of the present invention provide a method, a system, and a bus arbitration device for accessing a memory. The entire method for accessing the memory needs a comparator delay of the first degree, an and-gate of the Nth degree, and an or-gate of the Nth degree. A logic depth of a tree-formed comparator is an exclusive-OR gate delay of the log 2Nth degree in prior arts. The delay of a multi-digit comparator and the exclusive-OR gate is far more than that of the and-gate and the or-gate in a circuit. Due to that the present invention does not refer to the multi-digit comparator and the exclusive-OR gate but only refers to a comparator delay of the first degree, an and-gate of the Nth degree, and an or-gate of the Nth degree, the present invention shortens the delay of the bus arbitration switching circuit and increases the speed of the bus arbitration switching circuit, which enables the bus arbitration switching circuit to be widely employed in various SoC chips and meet various requirements.

Different embodiments in the present disclosure have been described. The matter in each embodiment focuses on differences from the others. The similarity in all the embodiments can be referred to by each other. As to embodiments referring to the system and the device, due to the similarity between them and the embodiments referring the method, the description may be a little simpler. The description in the method embodiments can be used as reference regarding those related portions.

A method, a system, and a bus arbitration device for accessing a memory have been detailed in the above descriptions. The principle and realization of the invention have been described by way of examples, which are only presented to facilitate understanding of the methodology and the substance of the invention. Numerous changes in the embodiments and the application areas can be made by those skilled in the art according to the substance of the invention. Accordingly, the foregoing description of embodiments should not be considered as definition of the scope of the present invention.

What is claimed is:

1. A method for accessing a memory, the method comprising:

comparing priorities of N function modules accessing the memory to obtain location information of a function module with a highest priority from the N function modules, where N is a natural number larger than one; and switching a bus of the function module to the memory via a bus arbitration device by logically operating the location information and bus information of each of the function modules, wherein the location information is a binary code with N digits, the function module corresponding to the digit has the highest priority when one digit of the location information is "1", and said comparing priorities of N function modules accessing the memory comprises:

comparing a priority of each of the function modules with respective priorities of other of the function modules according to a comparing scheme, generating an intermediate comparing result presented in a binary code with N−1 digits corresponding to the each of the function modules, each digit of the intermediate comparing result indicating a comparison result of the priorities between the each of the function modules and the other of the function modules; and performing an AND-operation on all digits of the intermediate comparing result of the each of function modules to obtain an operation result represented in a single binary code, N operation results arranged in order of serial numbers corresponding to the function modules including the location information of the function module with the highest priority.

2. The method as recited in claim 1, wherein the comparing scheme is:

when a serial number of a function module is larger than that of another function module being compared with, then to determine whether a value of the priority of the function module is larger than or equal to that of the other function module being compared, otherwise to determine whether the value of the priority of the function module is larger than that of the other function module being compared, wherein the value of the priority of the function module is larger, the priority of the function module is higher.

3. The method as recited in claim 2, wherein when all function modules have identical priorities, the function module with a largest serial number is awarded the highest priority.

4. The method as recited in claim 1, wherein the comparing scheme is:

if a serial number of a function module is smaller than that of another function module being compared, then determine whether the value of the priority of the function module is smaller than or equal to those of all the other function module being compared, else determine whether a value of the priority of the function module is smaller than that of the other function module being compared;

wherein the value of the priority of the function module is smaller, the priority of the function module is higher.

5. The method as recited in claim 4, wherein when all function modules have identical priorities, the function module with a smallest serial number is awarded the highest priority.

6. The method as recited in claim 4, wherein said performing logic operation on the location information and bus information of each function module comprises:

performing an AND-operation onto a same digit of the bus information of all function modules respectively with the digits of the location information corresponding to all function modules, obtaining N AND-operation results of the bus information of the function module at the same digit, wherein T is a bit width of the bus of the function module; and performing an OR-operation onto the N AND-operation results, obtaining an OR-operation result of the bus information of the function modules at the same digit; T OR-operation results of the bus information of the function modules obtained at all digits of the bus information composing the bus information of the function module with the highest priority, wherein the bus information of each function module is a binary code with T digits.

7. A bus arbitration device comprising:

a priority arbitration unit configured for comparing priorities of N function modules accessing a memory and obtaining location information of the function module with the highest priority; and a bus switch unit configured for switching a bus of the function module accessing the memory to the function module with the highest priority by logically operating the location information and bus information of each function module, wherein the location information obtained by the priority arbitration unit is a binary code with N digits, if one digit of the location information is "1", the function module corresponding to the digit has the highest priority, and the priority arbitration unit comprising:

a comparator configured for comparing the priority of each function module with the priorities of the other function modules and then respectively generating an intermediate comparing result represented by a binary code with N−1 digits corresponding to each function module, wherein each digit of the intermediate result indicates the result of the comparison between the function module and the other function modules; and a first AND-operation unit configured for performing an AND-operation onto all digits of the intermediate comparing result, corresponding to each function module, and thereby obtaining an operation result represented by a binary code with a single digit; the operation results of the N function modules arranged in an order of the N function modules' corresponding serial numbers composing the location information of the function module with the highest priority.

8. The bus arbitration device as recited in claim 7, wherein the comparing scheme is that: if a serial number of a function module is larger than that of another function module being compared, then to determine whether the value of the priority of the function module is larger than or equal to that of the other function module being compared, else to determine whether the value of the priority of the function module is larger than that of the other function module being compared; wherein, the value of the priority of the function module is larger, the priority of the function module is higher.

9. The bus arbitration device as recited in claim 7, wherein the comparing scheme is: when a serial number of a function module is smaller than that of another function module being compared, then to determine whether the value of the priority of the function module is smaller than or equal to those of all the other function module being compared, otherwise to determine whether a value of the priority of the function module is smaller than that of the other function module being compared; wherein the value of the priority of the function module is smaller, the priority of the function module is higher.

10. The bus arbitration device as recited in claim 7, wherein the bus switch unit comprising:

a second AND-operation unit configured for performing an AND-operation onto a same digit of bus information represented by a binary with T digits, of all function modules respectively with the digits of the location information corresponding to all function modules to obtain N AND-operation results of the bus information of the function module at the same digit; and an OR-operation unit configured for performing an OR-operation onto the N AND-operation results to obtain an OR-operation result of the bus information of the function modules at the same digit.

* * * * *